US008692803B2

(12) United States Patent
Yen et al.

(10) Patent No.: US 8,692,803 B2
(45) Date of Patent: *Apr. 8, 2014

(54) OPTICAL TOUCH APPARATUS AND OPERATING METHOD THEREOF

(75) Inventors: Meng-Shin Yen, Taipei (TW); William Wang, Taoyuan (TW); Chung-Cheng Chou, Lujhu Township, Taoyuan County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 1066 days.

This patent is subject to a terminal disclaimer.

(21) Appl. No.: 12/719,278

(22) Filed: Mar. 8, 2010

(65) Prior Publication Data

US 2011/0216040 A1    Sep. 8, 2011

(30) Foreign Application Priority Data

Apr. 15, 2009  (TW) .............................. 98112542 A

(51) Int. Cl.
*G06F 3/042* (2006.01)
(52) U.S. Cl.
USPC ......................................... 345/175; 345/173
(58) Field of Classification Search
USPC .......................... 345/32, 156, 204, 173–175;
178/18.01–18.07, 19.01–19.05
See application file for complete search history.

(56) References Cited

U.S. PATENT DOCUMENTS

| 4,107,522 | A  | * | 8/1978 | Walter ........................... 250/221 |
| 4,986,662 | A  | * | 1/1991 | Bures ............................. 356/621 |
| 5,196,835 | A  | * | 3/1993 | Blue et al. ...................... 345/175 |
| 5,707,160 | A  | * | 1/1998 | Bowen .......................... 400/472 |
| 7,274,356 | B2 | * | 9/2007 | Ung et al. ....................... 345/158 |
| 2006/0104561 | A1 | * | 5/2006 | Ivtsenkov ....................... 385/13 |
| 2006/0204164 | A1 | * | 9/2006 | Ivtsenkov ....................... 385/12 |
| 2010/0271307 | A1 | * | 10/2010 | Yen et al. ........................ 345/168 |
| 2010/0321343 | A1 | * | 12/2010 | Chou et al. ..................... 345/175 |

\* cited by examiner

*Primary Examiner* — Ricardo L Osorio

(57) ABSTRACT

An optical touch apparatus includes a light source emitting module, an optical module, a light sensing module, and a processing module. The optical module and the light sensing module are set on a first side and a second side of a surface of the optical touch apparatus. The light source emitting module sequentially emits a first light source and a second light source. A plurality of scanning lights of the second light source is uniformly distributed above the surface. The optical module receives the first light source and uniformly emits a plurality of lights. The light sensing module generates a first sensing result and a second sensing result based on the conditions of receiving the lights and scanning lights respectively. The processing module determines at least one touch point location corresponding to at least one object on the surface based on the first sensing result and the second sensing result.

25 Claims, 10 Drawing Sheets

| Receiving unit | D1 | D2 | D3 | D4 | D5 | D6 | D7 | D8 |
|---|---|---|---|---|---|---|---|---|
| Receiving condition | × | ◉ | × | ◉ | ◉ | × | ◉ | × |

| Receiving unit | D1 | D2 | D3 | D4 | D5 | D6 | D7 | D8 |
|---|---|---|---|---|---|---|---|---|
| Receiving condition | ◉ | × | × | × | × | × | × | ◉ |

| Receiving unit | D1 | D2 | D3 | D4 | D5 | D6 | D7 | D8 |
|---|---|---|---|---|---|---|---|---|
| Receiving condition | × | × | ◉ | ◉ | ◉ | ◉ | × | × |

| Receiving unit | D1 | D2 | D3 | D4 | D5 | D6 | D7 | D8 |
|---|---|---|---|---|---|---|---|---|
| Receiving condition | × | ◊ | × | ◊ | ◊ | × | ◊ | × |

| Receiving unit | D1 | D2 | D3 | D4 | D5 | D6 | D7 | D8 |
|---|---|---|---|---|---|---|---|---|
| Receiving condition | × | × | × | × | × | × | × | × |

| Receiving unit | D1 | D2 | D3 | D4 | D5 | D6 | D7 | D8 |
|---|---|---|---|---|---|---|---|---|
| Receiving condition | × | × | ◻ | × | × | ◻ | × | × |

| Receiving unit | D1 | D2 | D3 | D4 | D5 | D6 | D7 | D8 |
|---|---|---|---|---|---|---|---|---|
| Receiving condition | × | × | × | × | × | × | × | ◻ |

| Receiving unit | D1 | D2 | D3 | D4 | D5 | D6 | D7 | D8 |
|---|---|---|---|---|---|---|---|---|
| Receiving condition | ◻ | × | × | × | × | × | × | × |

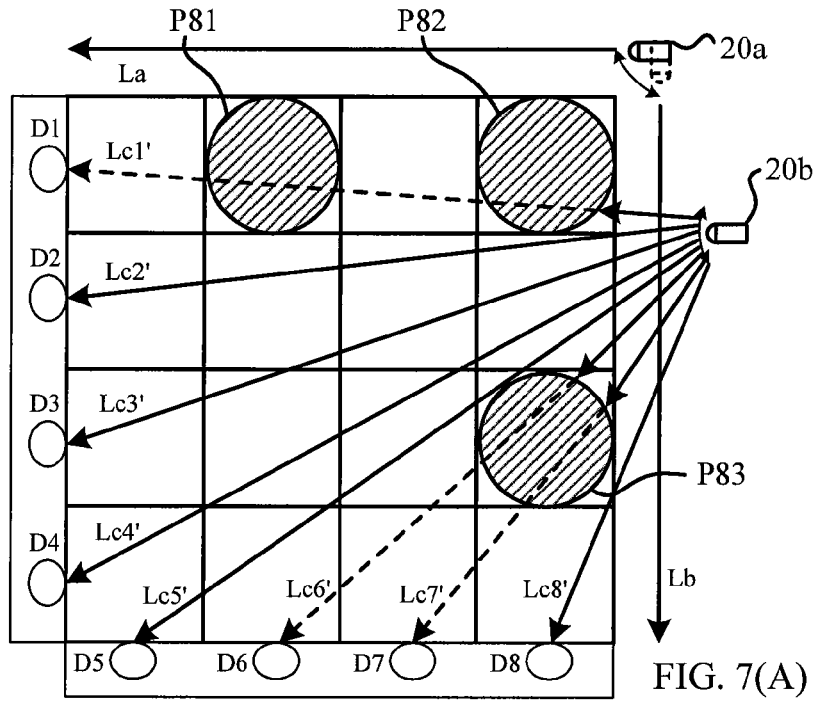
FIG. 7(A)
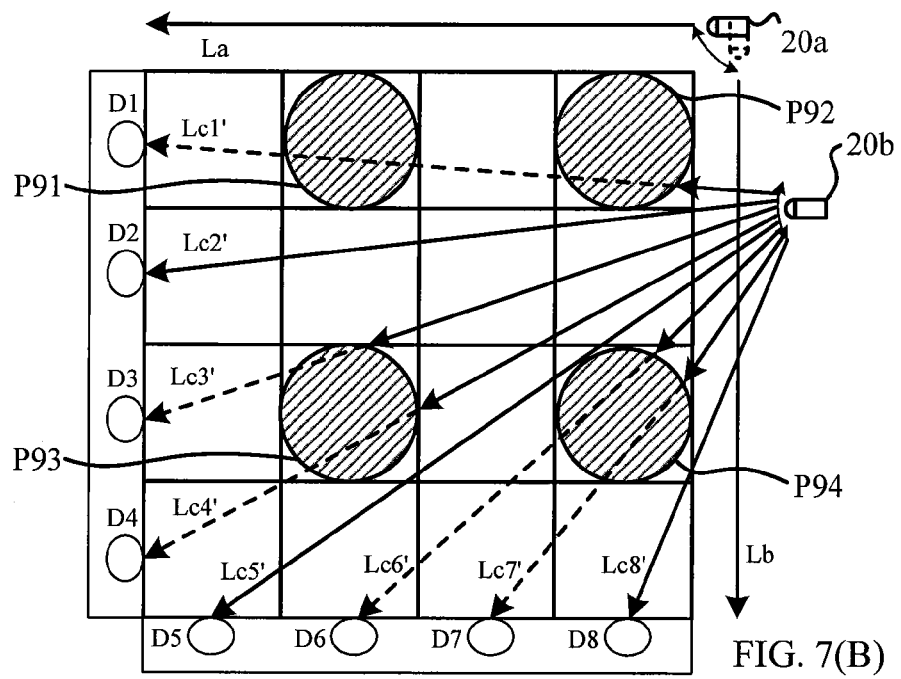
FIG. 7(B)
| Receiving unit | D1 | D2 | D3 | D4 | D5 | D6 | D7 | D8 |
|---|---|---|---|---|---|---|---|---|
| Receiving condition | × | ◌ | ◌ | ◌ | ◌ | × | × | ◌ |
FIG. 7(C)
| Receiving unit | D1 | D2 | D3 | D4 | D5 | D6 | D7 | D8 |
|---|---|---|---|---|---|---|---|---|
| Receiving condition | × | ◌ | × | × | ◌ | × | × | ◌ |
FIG. 7(D)

OPTICAL TOUCH APPARATUS AND OPERATING METHOD THEREOF

BACKGROUND OF THE INVENTION

1. Field of the Invention

The present invention relates to a touch apparatus, and more particularly, to an optical touch apparatus using scanning lights sequentially emitted from the rotational light source emitter and operating method thereof, so that the condition that the touch apparatus fails to sense the touch points can be effectively prevented.

2. Description of the Prior Art

Recently, with the developing of image display related technology, there are various new types of display apparatus shown on the market to replace the conventional CRT monitor gradually. Wherein, the touch liquid crystal display has advantages such as power saving, smaller size, and inputting by touching directly, therefore, the touch liquid crystal display is popular to the ordinary consumers and becomes the main stream of the display market. The touch liquid crystal display is widely used in various types of electronic products. In the various types of touch apparatus mentioned above, because the optical touch apparatus has a characteristic of good transmittance; it has become another well-used technology different from the resistance touch apparatus and the capacitance touch apparatus.

Although the current optical touch apparatus can easily achieve the touch detection with high resolution through simple optical devices such as a light guiding apparatus and a photoelectric sensing apparatus without setting a lot of light emitters and light receivers, and the complicated calculations via the triangulation measurement method can be also prevented. However, when the optical touch apparatus is applied to the multi-touch area, since the lights emitted from the optical touch apparatus are in the vertical direction or the horizontal direction, under some special multi-touch conditions, the optical touch apparatus will fail to determine these touch points or even make some wrong determinations of the positions of the touch points, therefore, the application range of the optical touch apparatus will be seriously limited and should be solved.

Therefore, the invention provides an optical touch apparatus and operating method thereof to solve the aforementioned problems.

SUMMARY OF THE INVENTION

The invention provides an optical touch apparatus using scanning lights sequentially emitted from the rotational light source emitter and operating method thereof, so that the condition that the touch apparatus fails to sense the touch points can be effectively prevented. The first embodiment of the invention is an optical touch apparatus. In this embodiment, the optical touch apparatus includes a light source emitting module, an optical module, a light sensing module, and a processing module. Wherein, the optical module and the light sensing module are set at a first side of a surface of the optical touch apparatus and a second side opposite to the first side respectively; the light sensing module is coupled to the processing module.

The first light source emitting module sequentially emits a first light source and a second light source, wherein a plurality of scanning lights of the second light source is uniformly distributed above a surface of the optical touch apparatus. The optical module receives the first light source and uniformly emits a plurality of first direction lights. The light sensing module generates a first sensing result and a second sensing result based on the condition of receiving the plurality of first direction lights and the plurality of scanning lights respectively, wherein the first sensing result and the second sensing result are related to whether the plurality of first direction lights and the plurality of scanning lights are blocked by at least one object above the surface respectively. The processing module determines at least one touch point location corresponding to the at least one object on the surface based on the first sensing result and the second sensing result.

The second embodiment of the invention is an optical touch apparatus operating method. In this embodiment, the optical touch apparatus includes a light source emitting module, an optical module, a light sensing module, and a processing module. Wherein, the optical module and the light sensing module are set at a first side of a surface of the optical touch apparatus and a second side opposite to the first side respectively. The method includes the following steps of: (a) the light source emitting module sequentially emitting a first light source and a second light source, wherein a plurality of scanning lights of the second light source is uniformly distributed above the surface; (b) the optical module receiving the first light source and uniformly emitting a plurality of lights; (c) the light sensing module generating a first sensing result and a second sensing result based on the condition of receiving the plurality of lights and the plurality of scanning lights respectively; (d) the processing module determining at least one touch point location corresponding to the at least one object on the surface based on the first sensing result and the second sensing result.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

Figure 4A:
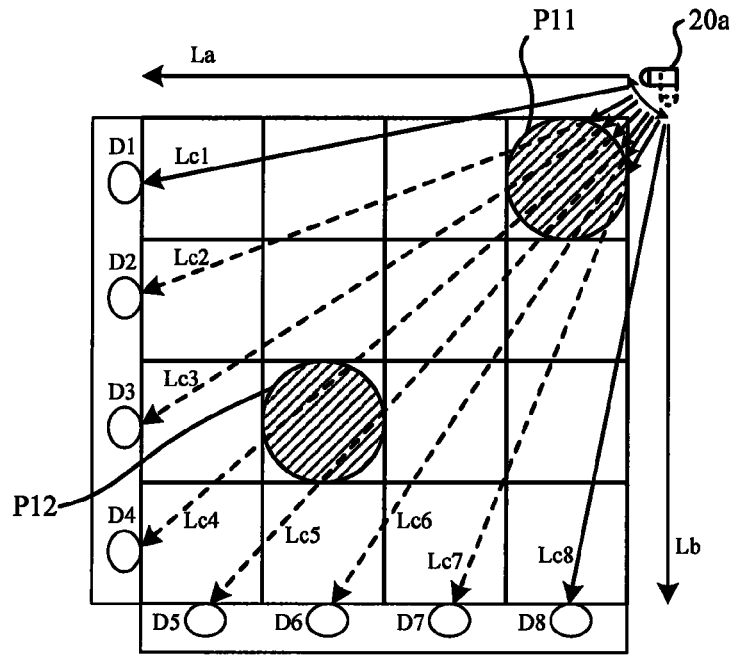
Figure 4B:
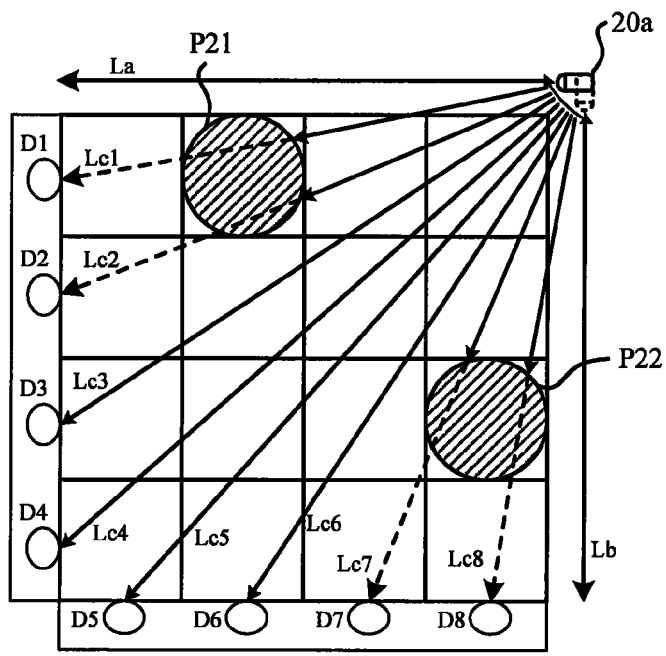
Figures 4C, 4D, 4E, 5A:
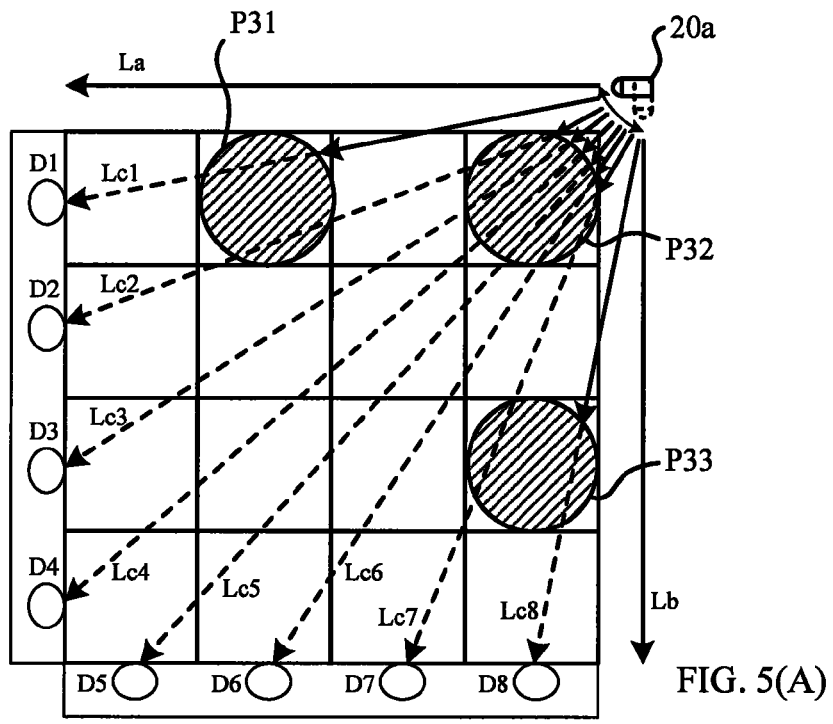

FIG. 4(A) and FIG. 4(B) illustrate examples of the optical touch apparatus detecting two touch points under the second touch mode; FIG. 4(C)~FIG. 4(E) illustrate different touch point sensing results.

FIGS. 5(A)~FIG. 5(D) illustrate examples of the optical touch apparatus detecting three touch points under the second touch mode; FIG. 5(E)~FIG. 5(I) illustrate different touch point sensing results.

Figure 5B:
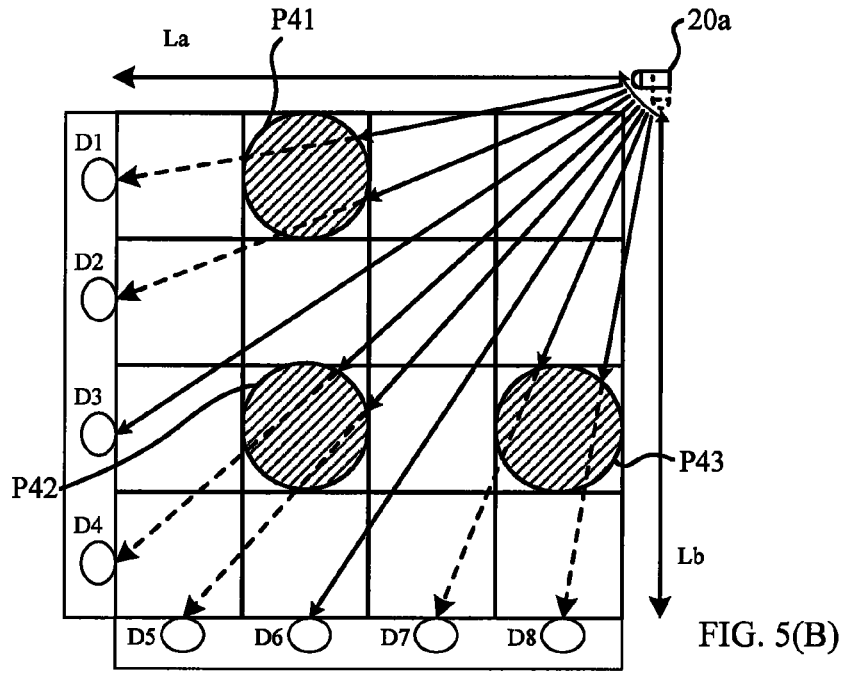
Figure 5C:
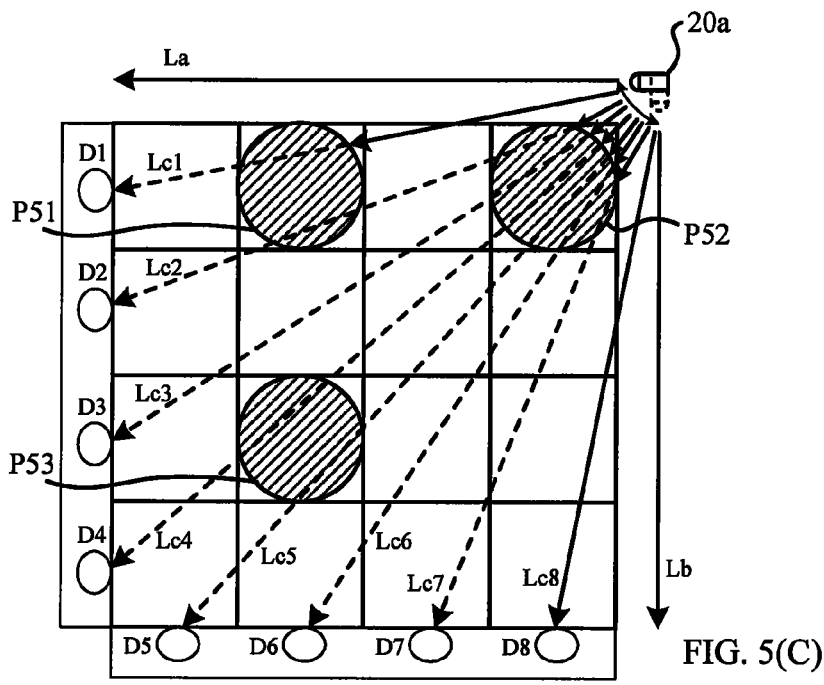
Figures 5D, 5E, 5F:
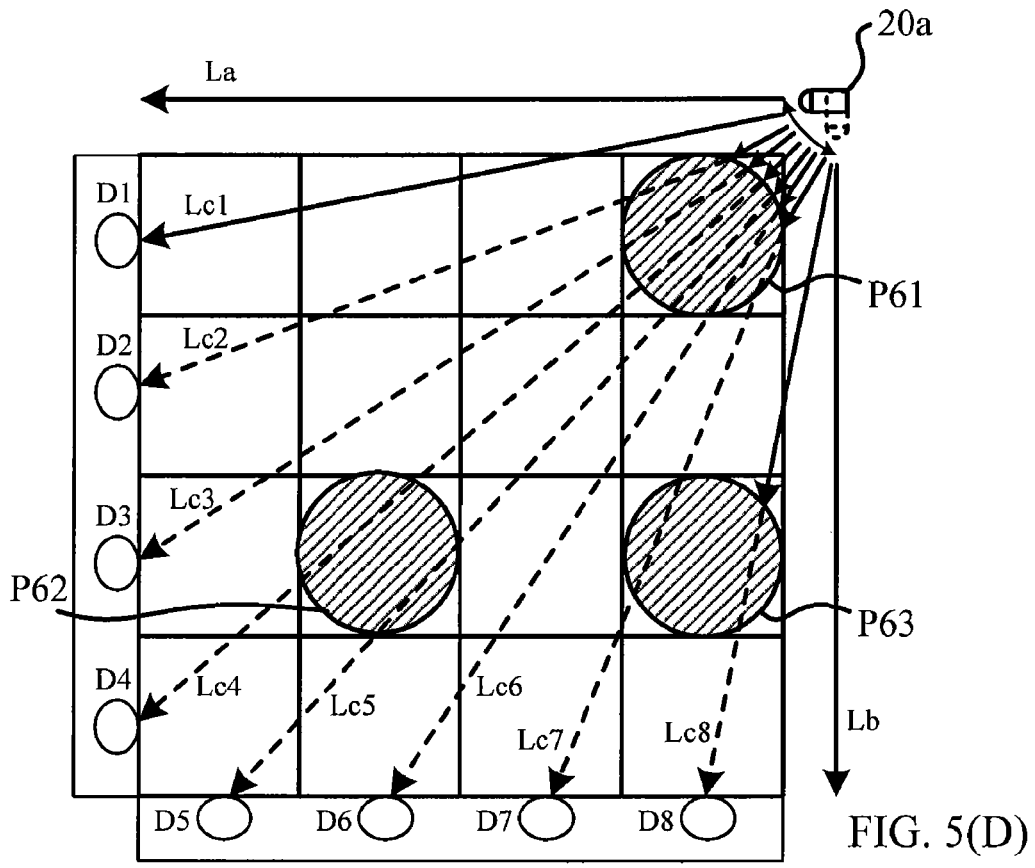
Figures 5G, 5H, 5I, 6:
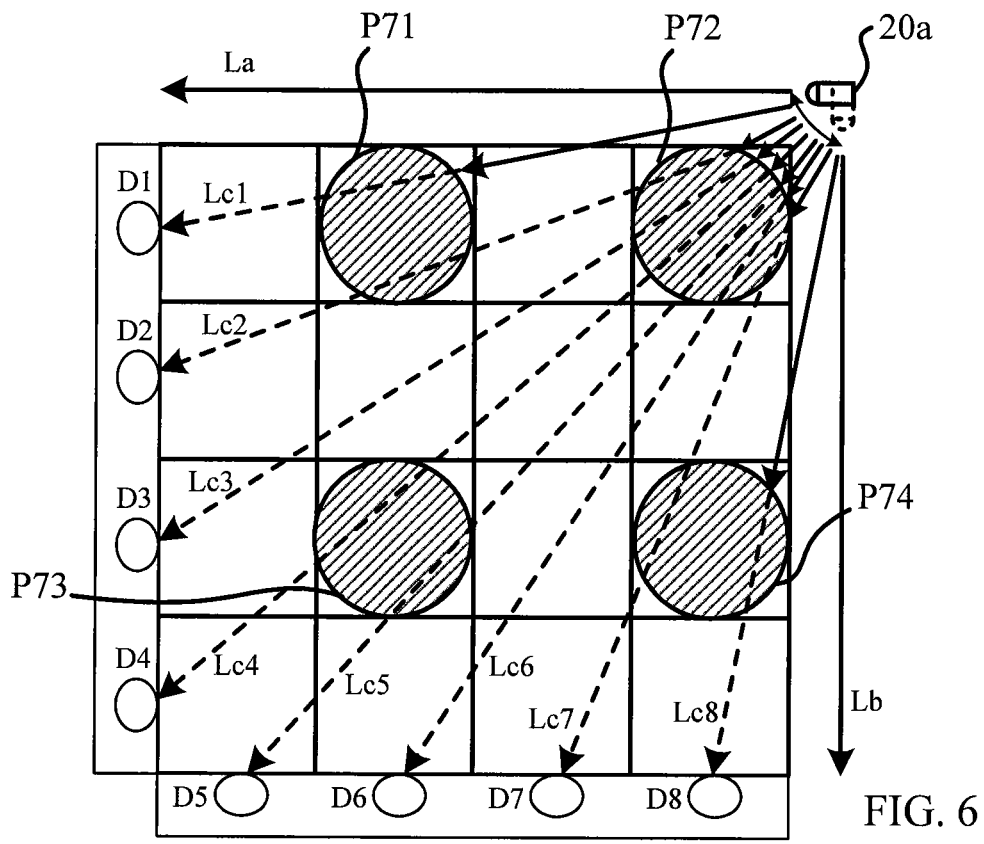

FIG. 6 illustrates the special conditions the optical touch apparatus fails to determine the touch points under the second touch mode.

FIGS. 7(A)~FIG. 7(B) illustrate examples of the optical touch apparatus detecting three and four touch points under the third touch mode; FIG. 7(C)~FIG. 7(D) illustrate different touch point sensing results.

Figure 8:
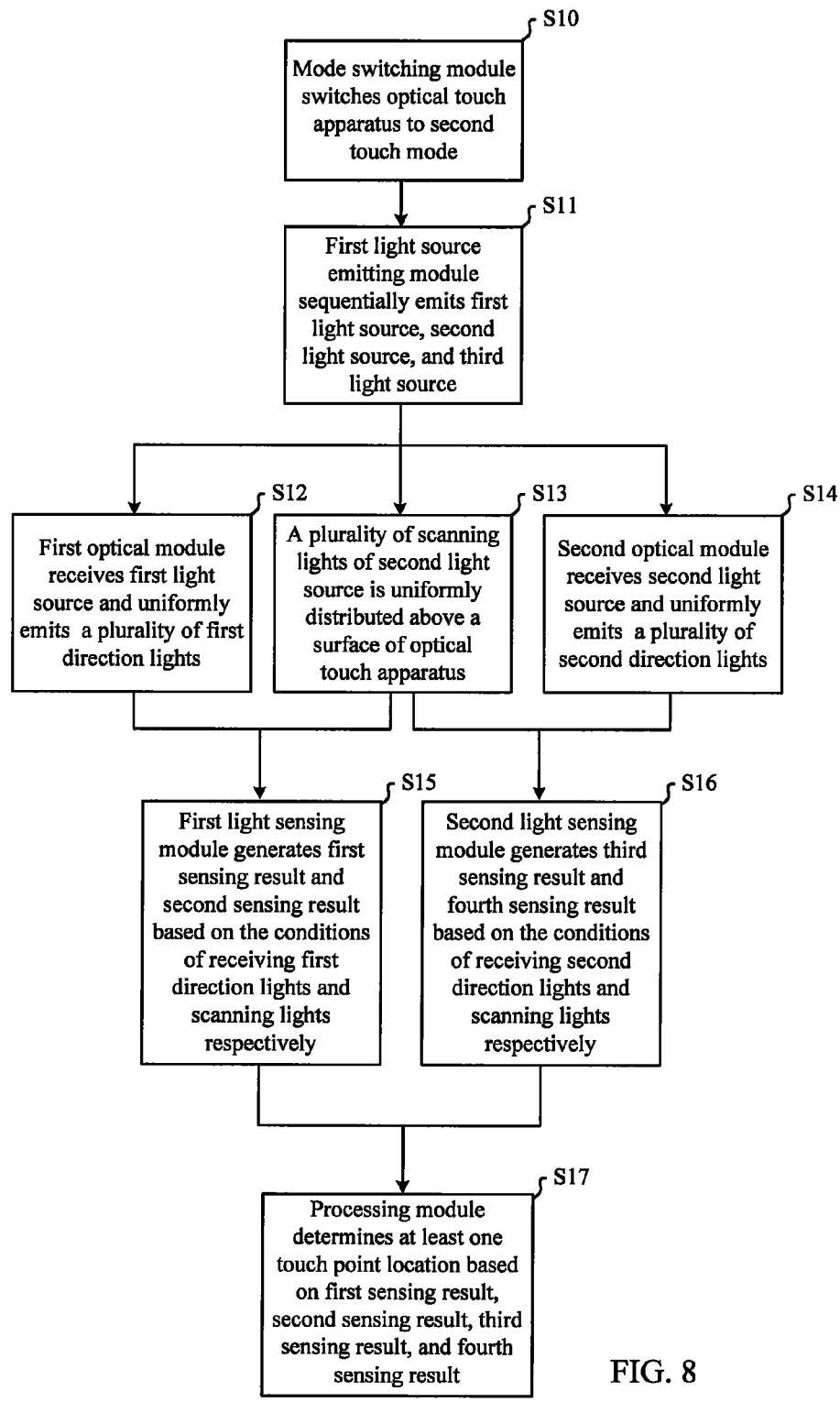
Figure 9:
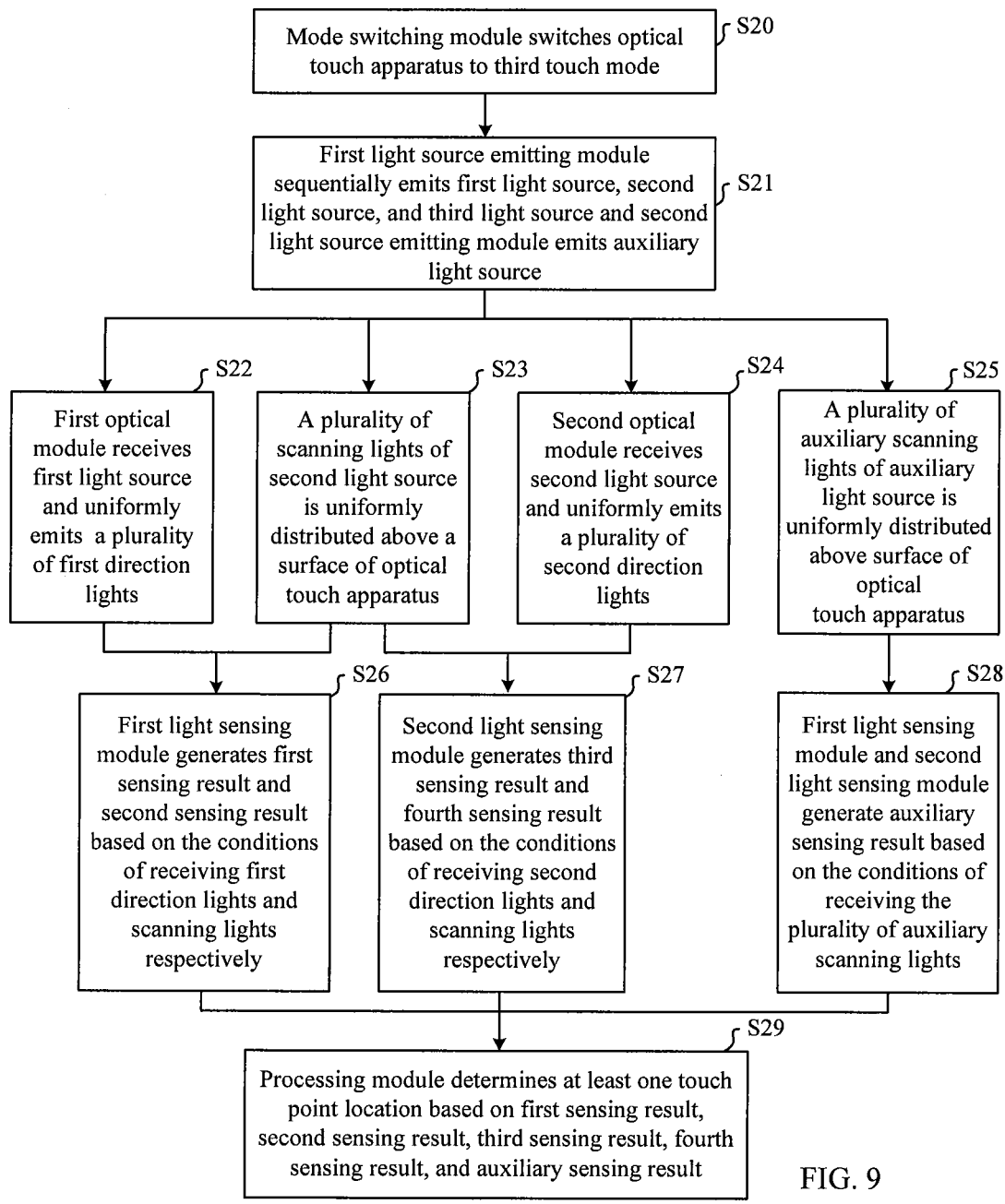

FIG. 8 and FIG. 9 illustrate flowcharts of the optical touch apparatus operating method under the second touch mode and the third touch mode respectively in the second embodiment of the invention.

DETAILED DESCRIPTION OF THE INVENTION

Figure 1:
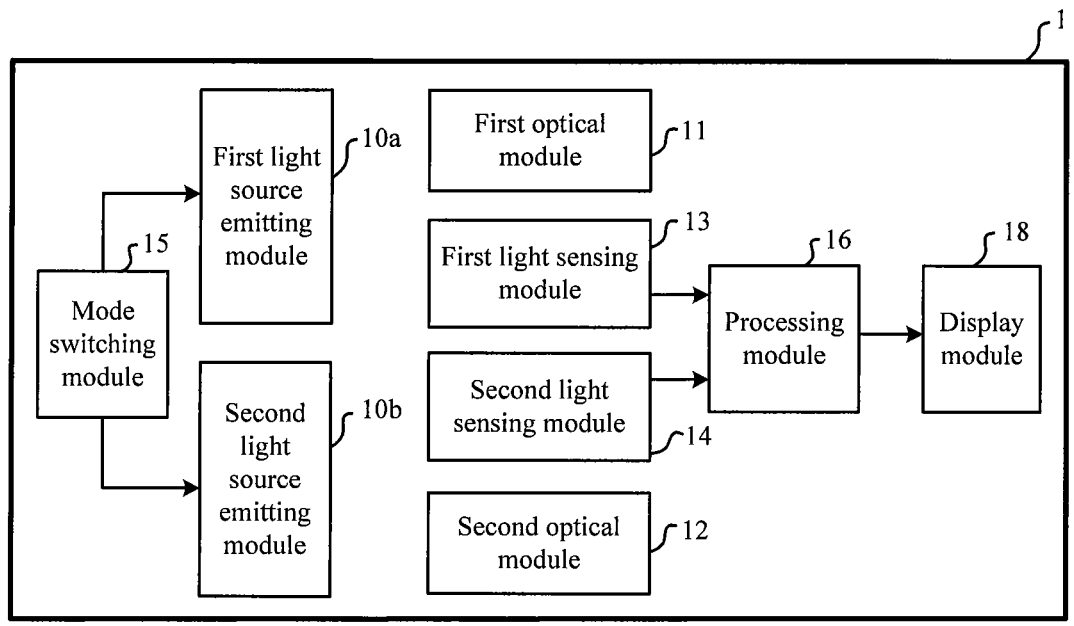
FIG. 1 and FIG. 2 illustrate a function block diagram and a scheme diagram of the optical touch apparatus of the first embodiment in the invention.
Figure 2:
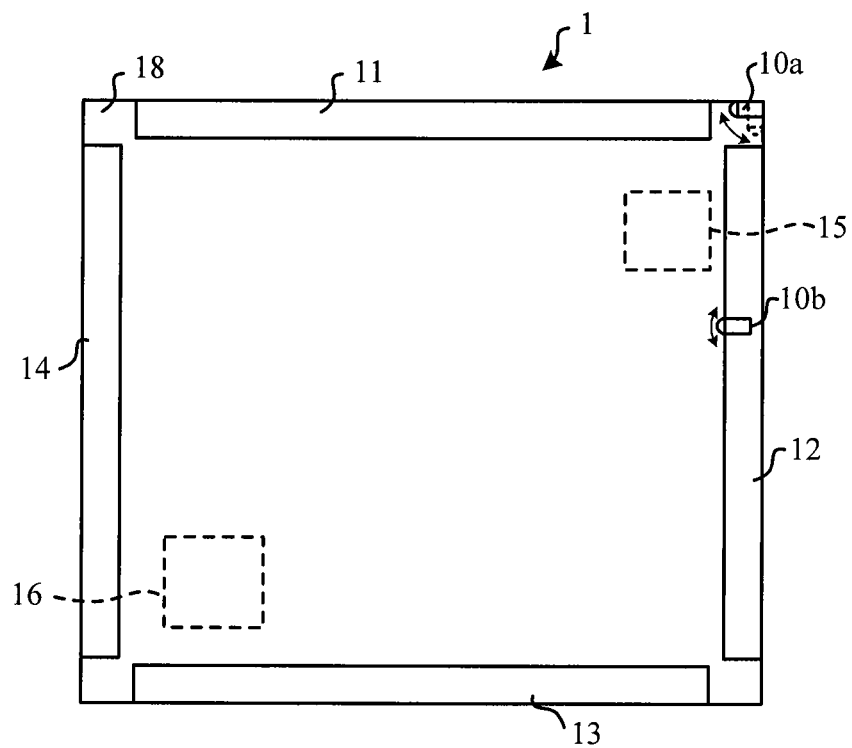

A first embodiment of the invention is an optical touch apparatus. In this embodiment, the optical touch apparatus can be applied to a LCD apparatus or other display apparatuses and have the functions of displaying screen and touch inputting. Please refer to FIG. 1 and FIG. 2. FIG. 1 and FIG. 2 show the function block diagram and the scheme diagram of the optical touch apparatus respectively.

As shown in FIG. 1 and FIG. 2, the optical touch apparatus 1 includes a first rotational light source emitting module 10a, a second rotational light source emitting module 10b, a first optical module 11, a second optical module 12, a first light sensing module 13, a second light sensing module 14, a mode switching module 15, a processing module 16, and a display module 18. Wherein, the first optical module 11 and the first light sensing module 13 are set at a first side and a second side of a surface of the display module 18 respectively, and the second side is opposite to the first side; the second optical module 12 and the second light sensing module 14 are set at a third side and a fourth side of the surface of the display module 18 respectively, and the fourth side is opposite to the third side; the first light sensing module 13 and the second light sensing module 14 are both coupled to the processing module 16; the mode switching module 15 is coupled to the first rotational light source emitting module 10a and the second rotational light source emitting module 10b; the processing module 16 is coupled to the display module 18.

In practical applications, the first rotational light source emitting module 10a and the second rotational light source emitting module 10b can be properly designed in mechanism to be a single light source emitting module. For example, if the first rotational light source emitting module 10a is integrated with a movable base, the first rotational light source emitting module 10a can be moved to anywhere around the surface to emit scanning lights via the movable base, so that the setting of the second rotational light source emitting module 10b is not necessary.

Next, the modules of the optical touch apparatus 1 will be introduced. At first, the first rotational light source emitting module 10a and the second rotational light source emitting module 10b provide the light sources needed when the optical touch apparatus 1 detects the touch points under different touch modes. In fact, the user can switch different touch modes via the mode switching module 15 to control the first rotational light source emitting module 10a and the second rotational light source emitting module 10b to be started or shut down.

In this embodiment, the first rotational light source emitting module 10a sequentially emits a first light source, a second light source, and a third light source, wherein the first light source is emitted to the first optical module 11, the scanning lights of the second light source is uniformly distributed above the surface and received by the first light sensing module 13 and the second light sensing module 14; the third light source is emitted to the second optical module 12. And, the second rotational light source emitting module 10b sequentially emits auxiliary light sources in a rotating way. A plurality of auxiliary scanning lights of the auxiliary light source is uniformly distributed above the surface and received by the first light sensing module 13 and the second light sensing module 14. In fact, there is no limitation for the types of the light sources emitted from the first rotational light source emitting module 10a and the second rotational light source emitting module 10b, they can be any kinds of light sources.

When the first optical module 11 receives the first light source, the first optical module 11 will uniformly emit a plurality of parallel first direction lights. Similarly, when the second optical module 12 receives the third light source, the second optical module 12 will uniformly emit a plurality of parallel second direction lights. In fact, the plurality of second direction lights will be vertical to the plurality of first direction lights. In this embodiment, the first optical module 11 and the second optical module 12 are both light guiding apparatuses (e.g., the light guiding plates) with light-guiding function, and the first optical module 11 and the second optical module 12 include a plurality of light guiding units respectively.

Figure 3A:
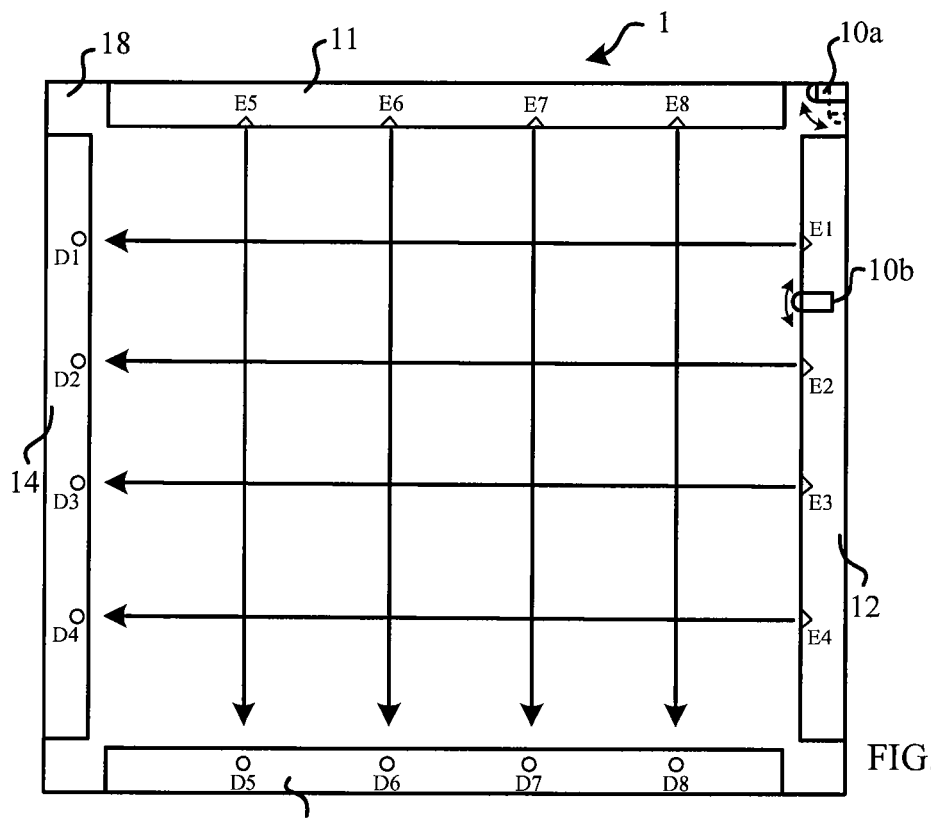
FIG. 3(A) illustrates a scheme diagram of operating the optical touch apparatus under the condition of no touch points.

Please refer to FIG. 3(A). FIG. 3(A) illustrates a scheme diagram of operating the optical touch apparatus 1 under the condition of no touch points. As shown in FIG. 3(A), the first optical module 11 and the second optical module 12 include four first light guiding units E5~E8 and four second guiding units E1~E4 respectively. Wherein, the first light guiding units E5~E8 emit parallel first direction lights $L_{x1}$~$L_{x4}$ respectively; the second light guiding units E1~E4 emit parallel second direction lights $L_{y1}$~$L_{y4}$ respectively. The first light sensing module 13 includes four first photoelectric sensing units D5~D8; the second light sensing module 14 includes four second photoelectric sensing units D1~D4. In practical applications, the first light sensing module 13 and the second light sensing module 14 can be replaced by two optical modules (e.g., the light guiding plates). The two optical modules sequentially receive the first direction lights and the second direction lights respectively, at this time, a large-angle photoelectric sensor (not shown in the figure) is needed to be set on the corner of the second side and the fourth side of the display module 18, so that the sensing results can be generated based on the conditions of the two optical modules sequentially receiving lights for the processing module to determine the position of the touch points.

Figure 3B:
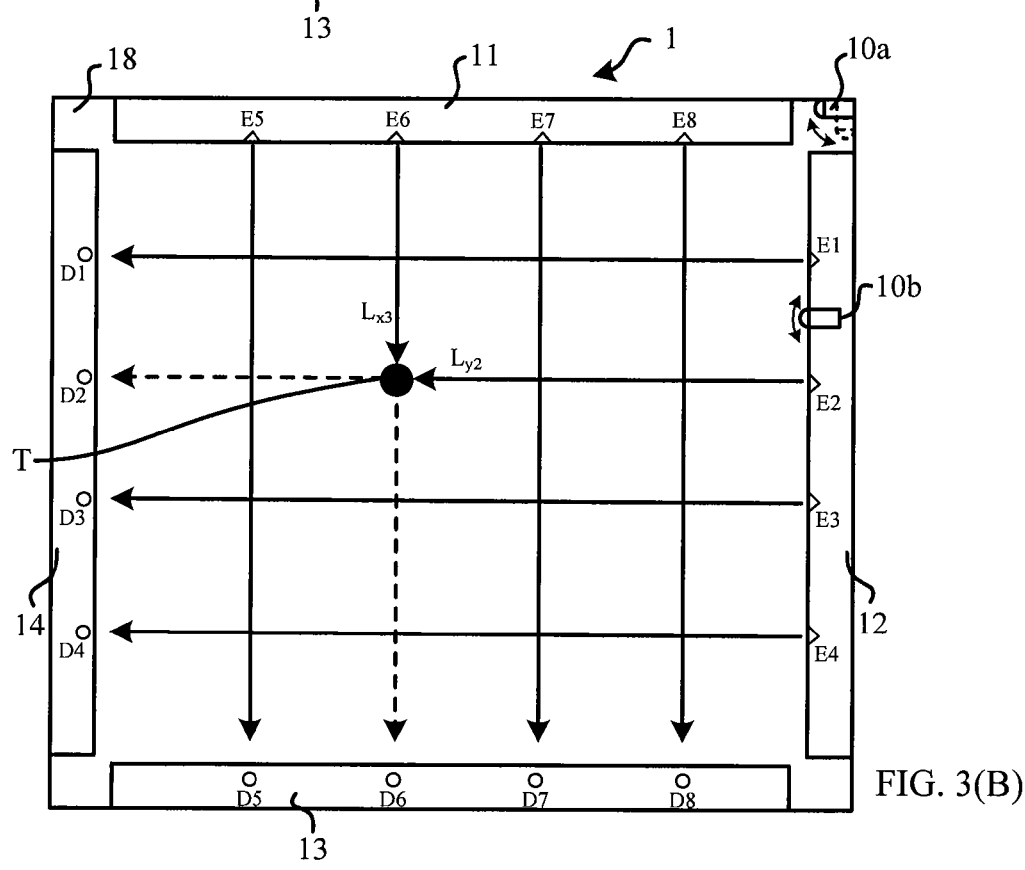
FIG. 3(B) illustrates an example of the optical touch apparatus detecting a single touch point under the first touch mode.

Please refer to FIG. 3(B). FIG. 3(B) illustrates an example of the optical touch apparatus 1 detecting a single touch point T under the first touch mode. It should be noticed that in the first touch mode, it is only the first rotational light source emitting module 10a needed to emit the first light source to the first optical module 11 and emit the third light source to the second optical module 12, so that the second rotational light source emitting module 10b is not necessary to be started. In fact, the touch point T can be formed by any objects, such as the fingers or touch pens, and the object is not necessary to touch the surface of the display module 18 to form the touch point T, once the object can block the lights above the surface of the display module 18, the touch point T will be formed.

Then, the first light sensing module 13 and the second light sensing module 14 will generate a first sensing result and a second sensing result based on whether the first photoelectric sensing units D5~D8 and the second photoelectric sensing units D1~D4 receive the first direction lights and the second direction lights respectively. Afterward, the processing module 16 can obtain the information that the first photoelectric sensing unit D6 and the second photoelectric sensing unit D2 fail to receive the lights, and find out that the first photoelectric sensing unit D6 corresponds to the first light guiding unit E6 and the horizontal axis coordinate $X_3$ and the second photoelectric sensing unit D2 corresponds to the second light guiding unit E2 and the vertical axis coordinate $Y_2$ based on a look-up table. Therefore, the processing module 16 can determine that the touch point formed by the object on the surface of the display module 18 should be (X3, Y2) based on the above-mentioned information.

As mentioned above, the first touch mode of the optical touch apparatus 1 can fully applied to the condition of single touch point, however, under some special multi-touch conditions, the optical touch apparatus 1 using the first touch mode will fail to sense the touch points or make wrong determination of touch points. At this time, the optical touch apparatus 1 has to use the second touch mode which is more precise than the first touch mode to determine the touch points. Please refer to FIG. 4(A) and FIG. 4(B). FIG. 4(A) and FIG. 4(B) illustrate examples of the optical touch apparatus 1 detecting two touch points under the second touch mode. It should be noticed that under the second touch mode, the first rotational light source emitting module 20a not only emits the first light source La to the first optical module 11 and emits the third light source Lb to the second optical module 12 respectively, but also sequentially emits the second light source to form the plurality of scanning lights Lc1~Lc8 uniformly distributed on the surface, and the second rotational light source emitting module is still not necessary to be used at this time.

In this embodiment, if the first touch mode is used to detect the touch points P11 and P12 in FIG. 4(A) and the touch points P21 and P22 in FIG. 4(B) respectively, the same sensing results will be obtained, as shown in FIG. 4(C). At this time, it is hard for the processing module 16 to determine whether the actual touch condition is the touch points P11 and P12 in FIG. 4(A) or the touch points P21 and P22 in FIG. 4(B) based on this sensing result. Under the second touch mode, this problem can be effectively solved by the plurality of scanning lights Lc1~Lc8 emitted from the first rotational light source emitting module 20a.

Please refer to FIG. 4(A) and FIG. 4(B). Since the object forming the touch point P11 blocks the scanning lights Lc2~Lc7, the sensing units D2~D7 can not receive the scanning lights, so that the sensing result as shown in FIG. 4(D) can be obtained. Similarly, as shown in FIG. 4(B) and FIG. 4(E), since the object forming the touch point P21 blocks the scanning lights Lc1~Lc2 and the object forming the touch point P22 blocks the scanning lights Lc7~Lc8, the sensing units D1~D2 and D7~D8 can not receive the scanning lights, so that the sensing result as shown in FIG. 4(E) can be obtained. Obviously, the sensing results in FIG. 4(D) and FIG. 4(E) are different; therefore, the processing module 17 can easily determine whether the actual touch condition is the touch points P11 and P12 shown in FIG. 4(A) or the touch points P21 and P22 shown in FIG. 4(B), and no confusion will be generated when the optical touch apparatus 1 determines the positions of the touch points.

Please refer to FIG. 5(A) to FIG. 5(D). FIG. 5(A)~FIG. 5(D) illustrate examples of the optical touch apparatus 1 detecting three touch points under the second touch mode. Similarly, if the first touch mode is used to detect the above-mentioned four conditions of touch points, the sensing result as shown in FIG. 5(E) will be obtained, therefore, the processing module 16 can not determines the positions of the touch points correctly. However, if the second touch mode is used to detect the touch points, four different sensing results as shown in FIG. 5(F) to FIG. 5(I) corresponding to four touch conditions of FIG. 5(A) to FIG. 5(D) can be obtained, therefore, the processing module 16 can easily determine the actual touch condition based on the sensing results.

In addition, because the second touch mode uses the scanning lights which is emitted sequentially to scan, in order to prevent each photoelectric sensing unit from receiving the other first direction lights different from the corresponding first direction light, a plurality of noise eliminating structures can be set on the surface of the first light sensing module 13, and the plurality of noise eliminating structures corresponds to the plurality of photoelectric sensing units respectively. Each noise eliminating structure can include a recess part or a cavity for containing the corresponding photoelectric sensing unit, only the corresponding first direction light can be allowed by the noise eliminating structure to be emitted into the corresponding photoelectric sensing unit through the recess part or the cavity, so that the wrong determination of the touch points can be prevented.

As mentioned above, the second touch mode of the optical touch apparatus 1 can effectively determine the positions of multiple touch points in most touch conditions; however, there are still few exceptional special touch conditions which can not be determined through the second touch mode. For example, please refer to FIG. 5(A) and FIG. 6. Although there are three touch points shown in FIG. 5(A) and there are four touch points shown in FIG. 6, the sensing results of FIG. 5(A) and FIG. 6 obtained by using the second touch mode will be the same with FIG. 5(F), all sensing units D1~D8 fail to receive scanning lights, therefore, the processing module 16 can not determine the actual touch condition is the same with FIG. 5(A) or FIG. 6 based on this sensing result. At this time, the optical touch apparatus 1 needs to use the third touch mode which is more precise to detect special multi-touch point conditions. As shown in FIG. 7(A) and FIG. 7(B), under the third touch mode, not only the first rotational light source emitting module 20a originally emits light source, but also the second rotational light source emitting module 20b needs to emit a plurality of auxiliary scanning lights Lc1'~Lc8' to generate the auxiliary sensing result to help the processing module 16 to determine the positions of the touch points.

Please refer to FIG. 7(C) and FIG. 7(D). FIG. 7(C) and FIG. 7(D) illustrate the auxiliary sensing result of three touch points P81~P83 shown in FIG. 7(A) and the auxiliary sensing result of four touch points P91~P94 shown in FIG. 7(B). As shown in FIG. 7(C) and FIG. 7(D), with the help of the auxiliary scanning lights Lc1'~Lc8' with angle different from that of the original scanning light, two auxiliary sensing results are obviously different, therefore, the processing module 16 can easily determine the positions of the touch points. Above all, the optical touch apparatus 1 of the invention can fully applied to any single touch point or multiple touch points conditions, and no wrong determination of the touch points will be occurred.

The second embodiment of the invention is an optical touch apparatus operating method. In this embodiment, the optical touch apparatus includes a first light source emitting module, a second light source emitting module, a first optical module, a second optical module, a first light sensing module, a second light sensing module, a mode switching module, and a processing module. Wherein, the first optical module and the first light sensing module are set at a first side and a second side of a surface of the optical touch apparatus respectively, and the second side is opposite to the first side; the second optical module and the second light sensing module are set at a third side and a fourth side of the surface of the optical touch apparatus respectively, and the fourth side is opposite to the third side. Since the method of operating the optical touch apparatus under the first touch mode is well-known, therefore, it is not described again here.

Next, the method of operating the optical touch apparatus under the second touch mode will be introduced. As shown in FIG. 8, at first, in step S10, the mode switching module switches the optical touch apparatus to the second touch mode. Then, in step S11, the first light source emitting module sequentially emits a first light source, a second light source, and a third light source. In step S12, the first optical module receives the first light source and uniformly emits a plurality of first direction lights; in step S13, a plurality of scanning lights of the second light source is uniformly distributed above the surface; in step S14, the second optical module receives the second light source and uniformly emits a plurality of second direction lights. Then, in step S15, the first light sensing module generates a first sensing result and a second sensing result based on the conditions of receiving the first direction lights and the scanning lights respectively, wherein the first sensing result and the second sensing result are related to whether the plurality of first direction lights and the plurality of scanning lights are blocked by at least one object above the surface respectively.

Similarly, in step S16, the second light sensing module generates a third sensing result and a fourth sensing result based on the conditions of receiving the second direction lights and the scanning lights respectively, wherein the third sensing result and the fourth sensing result are related to whether the plurality of second direction lights and the plurality of scanning lights are blocked by the at least one object above the surface respectively. Afterward, in step S17, the processing module determines the at least one touch point location on the surface based on the first sensing result, the second sensing result, the third sensing result, and the fourth sensing result.

Next, the method of operating the optical touch apparatus under the third touch mode will be introduced. As shown in FIG. 9, at first, in step S20, the mode switching module switches the optical touch apparatus to the third touch mode. Then, in step S21, the first light source emitting module sequentially emits a first light source, a second light source, and a third light source and the second light source emitting module emits an auxiliary light source. In step S22, the first optical module receives the first light source and uniformly emits a plurality of first direction lights; in step S23, a plurality of scanning lights of the second light source is uniformly distributed above a surface of the optical touch apparatus; in step S24, the second optical module receives the second light source and uniformly emits a plurality of second direction lights; in step S25, a plurality of auxiliary scanning lights of the auxiliary light source is uniformly distributed above the surface of the optical touch apparatus. Then, in step S26, the first light sensing module generates a first sensing result and a second sensing result based on the conditions of receiving the first direction lights and the scanning lights respectively, wherein the first sensing result and the second sensing result are related to whether the plurality of first direction lights and the plurality of scanning lights are blocked by at least one object above the surface respectively.

Similarly, in step S27, the second light sensing module generates a third sensing result and a fourth sensing result based on the conditions of receiving the second direction lights and the scanning lights respectively, wherein the third sensing result and the fourth sensing result are related to whether the plurality of second direction lights and the plurality of scanning lights are blocked by the at least one object above the surface respectively. It should be noticed that in step S28, the first light sensing module and the second light sensing module generate an auxiliary sensing result based on the conditions of receiving the plurality of auxiliary scanning lights. Afterward, in step S29, the processing module determines at least one touch point location based on the first sensing result, the second sensing result, the third sensing result, the fourth sensing result, and the auxiliary sensing result.

Compared to prior arts, the optical touch apparatus and operating method thereof disclosed by the invention not only includes the original light guiding apparatus and the photo-electric sensor, but also sequentially emits the scanning lights uniformly distributed above the touch surface through at least one rotational light source emitter to help the optical touch apparatus to determine multiple touch points, so that the condition that the optical touch apparatus fails to sense touch points or wrong determination under some special multiple touch point conditions can be prevented. Therefore, the optical touch apparatus can correctly determine all of the touch points under any single touch point or multiple touch point conditions. Additionally, the mode switching module of the optical touch apparatus can allow the user to freely select the touch modes, and the optical touch apparatus will detect touch points according to the touch mode selected by the user.

Although the present invention has been illustrated and described with reference to the preferred embodiment thereof, it should be understood that it is in no way limited to the details of such embodiment but is capable of numerous modifications within the scope of the appended claims.

What is claimed is:

1. An optical touch apparatus, comprising:
    a first light source emitting module, for sequentially emitting a first light source and a second light source, wherein a plurality of scanning lights of the second light source is uniformly distributed above a surface of the optical touch apparatus;
    a first optical module, set at a first side on the surface, for receiving the first light source and uniformly emitting a plurality of first direction lights;
    a first light sensing module, set at a second side opposite to the first side on the surface, for receiving the plurality of first direction lights and the plurality of scanning lights respectively, and generating a first sensing result and a second sensing result based on the condition of receiving the plurality of first direction lights and the plurality of scanning lights respectively, wherein the first sensing result and the second sensing result are related to whether the plurality of first direction lights and the plurality of scanning lights are blocked by at least one object above the surface respectively; and
    a processing module, coupled to the first light sensing module, for determining at least one touch point location corresponding to the at least one object on the surface based on the first sensing result and the second sensing result.

2. The optical touch apparatus of claim 1, further comprising:
    a second light source emitting module, for sequentially emitting an auxiliary light source, a plurality of auxiliary scanning lights of the auxiliary light source being uniformly distributed above the surface, the first light sensing module receiving the plurality of auxiliary scanning lights and generating an auxiliary sensing result based on the condition of receiving the plurality of auxiliary scanning lights, the processing module determining the at least one touch point location based on the first sensing result, the second sensing result, and the auxiliary sensing result.

3. The optical touch apparatus of claim 2, further comprising:
    a mode switching module, coupled to the first light source emitting module and the second light source emitting module, when the mode switching module is switched to a specific touch mode, the mode switching module selectively starting or shutting down the first light source emitting module and/or the second light source emitting module based on the specific touch mode.

4. The optical touch apparatus of claim 2, wherein the second light source emitting module is set relative to the first light source emitting module and used for providing the auxiliary light source with emitting angle different from that of the first light source emitting module.

5. The optical touch apparatus of claim 2, wherein the second light source emitting module is movably set around the optical touch apparatus on any position different from the first light source emitting module.

6. The optical touch apparatus of claim 2, wherein the first light source emitting module and the second light source emitting module are rotational light source emitters.

7. The optical touch apparatus of claim 1, wherein the first light source emitting module is movably set around the optical touch apparatus, when the first light source emitting module is moved to any other position around the optical touch apparatus, the first light source emitting module can also sequentially emit an auxiliary light source, a plurality of auxiliary scanning lights of the auxiliary light source is uniformly distributed above the surface, the first light sensing module receives the plurality of auxiliary scanning lights and generates an auxiliary sensing result based on the condition of receiving the plurality of auxiliary scanning lights, the processing module determines the at least one touch point location based on the first sensing result, the second sensing result, and the auxiliary sensing result.

8. The optical touch apparatus of claim 1, wherein the first optical module comprises a plurality of light guiding units, the first light sensing module comprises a plurality of photoelectric sensing units, a first photoelectric sensing unit of the plurality of photoelectric sensing units corresponds to a first light guiding unit of the plurality of light guiding units and a first position, and the first photoelectric sensing unit is used to receive a first direction light emitted from the first light guiding unit.

9. The optical touch apparatus of claim 8, wherein when the first direction light emitted from the first light guiding unit is blocked by the object, the first photoelectric sensing unit will send out an un-received signal, the first light sensing module generates the first sensing result based on the un-received signal and the first position corresponding to the first photoelectric sensing unit.

10. The optical touch apparatus of claim 8, wherein a plurality of noise eliminating structures is set on the surface of the first light sensing module, the plurality of noise eliminating structures corresponds to the plurality of photoelectric sensing units respectively to prevent each photoelectric sensing unit from receiving the other first direction lights different from the corresponding first direction light.

11. The optical touch apparatus of claim 10, wherein the noise eliminating structure comprises a recess part or a cavity for containing the corresponding photoelectric sensing unit, only the corresponding first direction light can be allowed by the noise eliminating structure to be emitted into the corresponding photoelectric sensing unit through the recess part or the cavity.

12. The optical touch apparatus of claim 1, further comprising:
a second optical module, set at a third side on the surface, for receiving a third light source provided by the first light source emitting module and uniformly emitting a plurality of second direction lights; and
a second light sensing module, set at a fourth side opposite to the third side on the surface and coupled to the processing module, for receiving the plurality of second direction lights and the plurality of scanning lights respectively, and generating a third sensing result and a fourth sensing result based on the condition of receiving the plurality of second direction lights and the plurality of scanning lights respectively, wherein the third sensing result and the fourth sensing result are related to whether the plurality of second direction lights and the plurality of scanning lights are blocked by the at least one object above the surface respectively, the processing module determines the at least one touch point location on the surface based on the first sensing result, the second sensing result, the third sensing result, and the fourth sensing result.

13. The optical touch apparatus of claim 12, further comprising
a second light source emitting module, for sequentially emitting an auxiliary light source, a plurality of auxiliary scanning lights of the auxiliary light source being uniformly distributed above the surface, the first light sensing module and the second light sensing module receiving the plurality of auxiliary scanning lights and generating an auxiliary sensing result based on the condition of receiving the plurality of auxiliary scanning lights, the processing module determining the at least one touch point location based on the first sensing result, the second sensing result, the third sensing result, the fourth sensing result, and the auxiliary sensing result.

14. A method of operating an optical touch apparatus, the optical touch apparatus comprising a first light source emitting module, a first optical module, a first light sensing module, and a processing module, the first optical module being set at a first side on a surface of the optical touch apparatus, the first light sensing module being set at a second side opposite to the first side on the surface, the method comprising the steps of:
the first light source emitting module sequentially emitting a first light source and a second light source, wherein a plurality of scanning lights of the second light source is uniformly distributed above the surface;
the first optical module receiving the first light source and uniformly emitting a plurality of first direction lights;
the first light sensing module receiving the plurality of first direction lights and the plurality of scanning lights respectively, and generating a first sensing result and a second sensing result based on the condition of receiving the plurality of first direction lights and the plurality of scanning lights respectively, wherein the first sensing result and the second sensing result are related to whether the plurality of first direction lights and the plurality of scanning lights are blocked by at least one object above the surface respectively; and
the processing module determining at least one touch point location corresponding to the at least one object on the surface based on the first sensing result and the second sensing result.

15. The method of claim 14, wherein the optical touch apparatus further comprising a second light source emitting module, the method further comprises the steps of:
the second light source emitting module sequentially emitting an auxiliary light source, wherein a plurality of auxiliary scanning lights of the auxiliary light source is uniformly distributed above the surface;
the first light sensing module receiving the plurality of auxiliary scanning lights and generating an auxiliary sensing result based on the condition of receiving the plurality of auxiliary scanning lights; and
the processing module determining the at least one touch point location based on the first sensing result, the second sensing result, and the auxiliary sensing result.

16. The method of claim 15, wherein the optical touch apparatus further comprises a mode switching module, the method further comprises the step of:
when the mode switching module is switched to a specific touch mode, the mode switching module selectively starting or shutting down the first light source emitting module and/or the second light source emitting module based on the specific touch mode.

17. The method of claim 15, wherein the second light source emitting module is set relative to the first light source emitting module and used for providing the auxiliary light source with emitting angle different from that of the first light source emitting module.

18. The method of claim 15, wherein the second light source emitting module is movably set around the optical touch apparatus on any position different from the first light source emitting module.

19. The method of claim 15, wherein the first light source emitting module and the second light source emitting module are rotational light source emitters.

20. The method of claim 14, wherein the first light source emitting module is movably set around the optical touch apparatus, when the first light source emitting module is moved to any other position around the optical touch apparatus, the first light source emitting module can also sequentially emit an auxiliary light source, a plurality of auxiliary scanning lights of the auxiliary light source is uniformly distributed above the surface, the first light sensing module receives the plurality of auxiliary scanning lights and generates an auxiliary sensing result based on the condition of receiving the plurality of auxiliary scanning lights, the processing module determines the at least one touch point location based on the first sensing result, the second sensing result, and the auxiliary sensing result.

21. The method of claim 14, wherein the first optical module comprises a plurality of light guiding units, the first light sensing module comprises a plurality of photoelectric sensing units, a first photoelectric sensing unit of the plurality of photoelectric sensing units corresponds to a first light guiding unit of the plurality of light guiding units and a first position, and the first photoelectric sensing unit is used to receive a first direction light emitted from the first light guiding unit.

22. The method of claim 21, wherein when the first direction light emitted from the first light guiding unit is blocked by the object, the first photoelectric sensing unit will send out an un-received signal, the first light sensing module generates the first sensing result based on the un-received signal and the first position corresponding to the first photoelectric sensing unit.

23. The method of claim 14, wherein the optical touch apparatus further comprises a second optical module and a second light sensing module, the second optical module is set at a third side on the surface and the second light sensing module is set at a fourth side opposite to the third side on the surface, the method further comprises the steps of:

the second optical module receiving a third light source provided by the first light source emitting module and uniformly emitting a plurality of second direction lights;
the second light sensing module receiving the plurality of second direction lights and the plurality of scanning lights respectively, and generating a third sensing result and a fourth sensing result based on the condition of receiving the plurality of second direction lights and the plurality of scanning lights respectively, wherein the third sensing result and the fourth sensing result are related to whether the plurality of second direction lights and the plurality of scanning lights are blocked by the at least one object above the surface respectively; and
the processing module determining the at least one touch point location on the surface based on the first sensing result, the second sensing result, the third sensing result, and the fourth sensing result.

24. The method of claim 23, wherein the optical touch apparatus further comprises a second light source emitting module, the method further comprises the steps of:
the second light source emitting module sequentially emitting an auxiliary light source, wherein a plurality of auxiliary scanning lights of the auxiliary light source is uniformly distributed above the surface;
the first light sensing module and the second light sensing module receiving the plurality of auxiliary scanning lights and generating an auxiliary sensing result based on the condition of receiving the plurality of auxiliary scanning lights; and
the processing module determining the at least one touch point location based on the first sensing result, the second sensing result, the third sensing result, the fourth sensing result, and the auxiliary sensing result.

25. An optical touch apparatus, comprising:
an emitting module, set at a first side on a surface of the optical touch apparatus, for receiving a first light source and uniformly emitting a plurality of lights;
a receiving module, set at a second side opposite to the first side on the surface, for receiving the plurality of lights and a plurality of scanning lights emitted from a second light source respectively, and generating a first sensing result and a second sensing result based on the condition of receiving the plurality of lights and the plurality of scanning lights respectively, wherein the first sensing result and the second sensing result are related to whether the plurality of lights and the plurality of scanning lights are blocked by at least one object above the surface respectively; and
a processing module, coupled to the receiving module, for determining at least one touch point location corresponding to the at least one object on the surface based on the first sensing result and the second sensing result.

* * * * *